Nov. 20, 1951 W. F. HOAG ET AL 2,576,069
TORQUE-LIMITING WRENCH
Filed Dec. 4, 1947
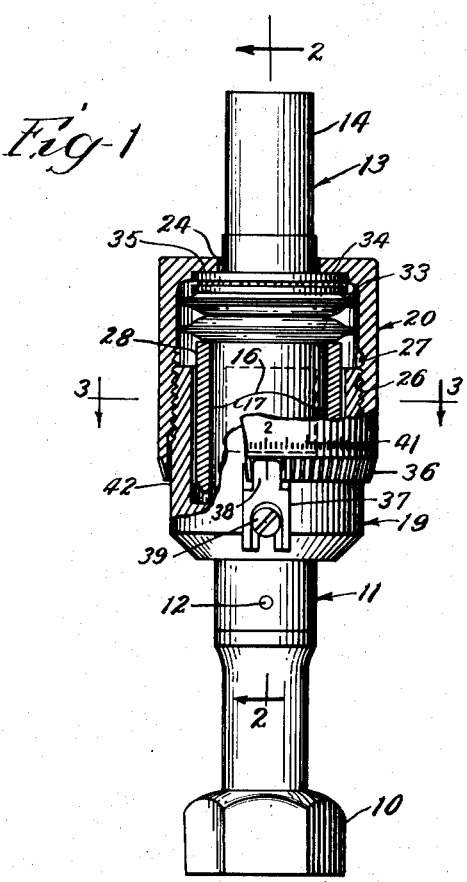
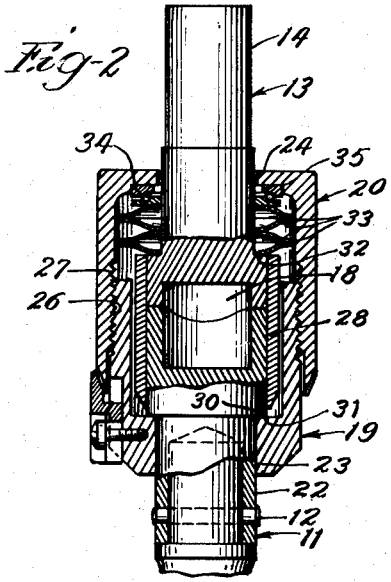
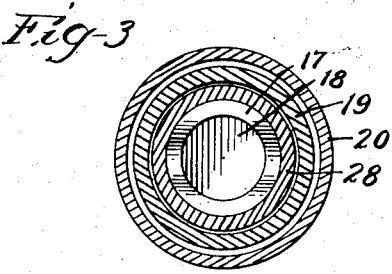
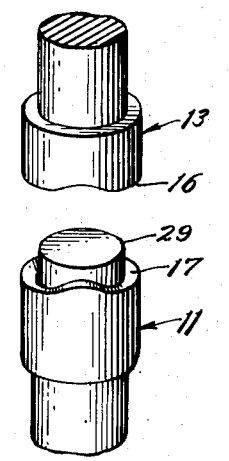
Inventors.
Wilton F. Hoag &
Clarence F. Carlson
By:- Mann and Brown
Attys.

Patented Nov. 20, 1951

2,576,069

UNITED STATES PATENT OFFICE 2,576,069

TORQUE-LIMITING WRENCH

Wilton Folsom Hoag and Clarence F. Carlson, Batavia, Ill.

Application December 4, 1947, Serial No. 789,590

8 Claims. (Cl. 64—29)

Our invention relates to a wrench, particularly that type of wrench which is power actuated and in which the torque to be applied to a nut, bolt, or other device with which the wrench is engaged, can be limited to a predetermined maximum value. Such devices are particularly useful and necessary in mass assembly processes where the same operation is repeatedly performed by an individual operator or machine. To do this there is provided a new cam-type clutch of sufficiently small size that is readily adapted for use with hand or power-driven tools, and in which the amount of maximum torque transmitted by the clutch may be quickly and readily adjusted and which may be calibrated within reasonably accurate limits.

An outstanding feature of my invention is the inclusion of clutch faces of a type which give the clutch a harmonic motion and allow a smooth and quiet relative rotation between the driving and the driven shaft when the torque transmitted through the clutch exceeds the predetermined desired maximum.

Other features of our invention include: a clutch so constructed that there will be no tendency for the driven element to slip in a direction in reverse to that of the desired rotation; a clutch that may be driven in either direction of rotation and in which the torque calibration will be the same for both directions of rotation; and a clutch which is simple to construct and operate and which occupies a minimum of space.

Additional features of our invention will become apparent from a study of the following description and of the drawings in which Fig. 1 is an elevational view of an embodiment of my invention with a portion of the clutch barrel broken away to show the inner construction of the clutch;

Fig. 2 is a longitudinal section of the clutch taken on line 2—2 of Fig. 1;

Fig. 3 is a transverse section taken at line 3—3 of Fig. 1; and

Fig. 4 is a perspective view of the clutch faces, illustrating an alternative method of alignment of the driving and driven elements.

While a torque-limiting clutch may have many uses, it is particularly adapted for use with socket wrench 10 for tightening a nut or stud bolt. The wrench 10 may be affixed to the driven element, generally designated 11, of the clutch, by means of a pin 12. A driving element, generally designated 13, is formed with a shank 14 which is adapted to be received in a rotary tool, such as an electric hand drill. The inner end of the driving element 13 has an annular clutch face 16, which mates with a similar annular clutch face 17 on the inner end of driven element 11. The mating clutch faces 16 and 17 are of sinesoidal form giving them what may be termed a harmonic curved configuration. Preferably, two complete cycles of such harmonic curve are used, as this will permit the forming of a smooth curve and will result in the occurrence of a cycle of clutch movement (i. e., disengagement and subsequent engagement) for each 180° of rotation of one element with respect to the other. To facilitate the process of shaping the clutch faces, a relieved portion 18 is first formed within the mating ends of the driving and driven elements.

The face ends of the clutch elements are housed within a hollow barrel assembly, comprising an inner barrel, an outer barrel, generally designated 19 and 20, respectively. A shank 22 of driven element 11 is journaled in an end opening 23 of the inner barrel 19 while the shank of driving element 13 is journaled in an opening 24 in the end of outer barrel 20.

The external periphery of the inner barrel 19 is formed with a series of threads 26 which engage threads 27 about the inner face of the outer barrel 20. Threads 26 and 27 serve to releasably engage the two barrels and to allow adjustment of the axial length of the internal opening of the barrel assembly.

The driving and driven elements are rotatable with respect to each other and are maintained in alignment by means of an annular collar 28 about the periphery thereof. As an alternative method of maintaining the alignment of the clutch faces, a circular plug 29 may be inserted in the relieved portions 18 of the clutch elements, as shown in Fig. 4. If the plug 29 is used, the collar 28 may or may not be dispensed with.

To limit the axial movement of driven element 11 outwardly of the barrel assembly, a shoulder 30 is provided thereon which abuts the end 31 of inner barrel 19. A shoulder 32 is formed about the driving member 13 to act as a seat for the Belleville springs 33 which are stacked in series between the shoulder 32 and thrust bearing 34 abutting the end 35 of outer barrel 20. While the use of a thrust bearing is desirable in view of the smooth, more readily calibrated action which it imparts to the clutch, it may be dispensed with in certain embodiments of invention.

We prefer to use Belleville springs, modified by the addition of a flat annular lip formed about the outer ends of the springs as the modification increases the resistance of the spring. Belleville springs are particularly adapted for this purpose because the load thereon may be increased rapidly with only a small deflection in the spring. The use of Belleville springs, in cooperation with the particular harmonic configuration of the clutch faces, produce a clutch which will slip under excessive torque and allow relative rotation between driving and driven shafts without the chattering, with the attendant vibration and noise, characterizing the operation of conventional cam-type clutches.

A portion of the periphery of the outer barrel 20 is formed with a contiguous series of teeth 36 which cooperate with a dog 37 having teeth on the inner portion of end 38 thereof. The dog is affixed to the inner barrel 19 by means of a screw 39 and by engaging teeth 36 acts to prevent rotation of the inner and outer barrel with respect to each other. Loosening of the screw 39 will permit the dog to be disengaged from teeth 36 and will allow the inner barrel to be screwed either in or out of the outer barrel, thus adjusting the axial length of the barrel assembly and the preloading placed on the springs. The amount of such preloading will determine the torque required to cause slippage between the clutch faces.

A calibration scale 41 may be formed about the periphery of the outer barrel 20, and is used in cooperation with index line 42 on the dog to indicate the adjustment of the barrels for a desired torque.

A particular feature of our invention is the configuration of the clutch faces 16 and 17. The preferable shape of these is that of a sine curve but the plotting of such curve, assuming a given amplitude, must be expanded sufficiently that the axial movement of one clutch face relative to the other under slipping load will not be an abrupt change, but rather will be a smooth harmonic motion. If the same curve is plotted over a relatively short distance, the clutch action will be abrupt in a snapping fashion. We have found that if these clutch faces are so formed that the angle of contact between the clutch faces does not exceed the angle of repose of the clutch elements, with no imposed axial load, the desired smooth action will be obtained. Furthermore, with such construction the friction of the clutch facings, in addition to the other inherent friction of the clutch, will prevent the driven member from having any tendency to slip backward should the load be suddenly removed. In certain applications of this clutch in the machinery field, it is highly desirable that the driven shaft be not allowed to rotate in a reversed direction, even momentarily, in the event the load is removed.

It will be readily apparent that this clutch has innumerable applications for use with rotating devices other than wrenches. It may be used in substantially any installation where torque-limiting control is required. Furthermore, the axial movement of the driving member, which results when slippage occurs in the clutch, may be readily utilized to provide a throw-out action for a plate or tooth clutch.

The description of selected forms of our invention in specific detail for the purpose of disclosure and to illustrate the principles involved will suggest various changes and substitutions that may be made in practice, and we reserve the right to all such departures from our descriptions that lie within the scope of our appended claims.

We claim:

1. In a device of the type described, a driving member, a driven member in axial alignment with said driving member, an outer barrel, an inner barrel threaded into said outer barrel thereby forming a barrel assembly, means to lock said barrels together to prevent rotation of one with respect to the other, one of said members being journaled in the end of said outer barrel, the other of said members being journaled in the end of said inner barrel, the ends of said members within said barrel assembly being formed with annular, cam-type clutch facings, said facings having a harmonic curved configuration and adapted to mate with each other, a first of said members being restrained from outward axial movement with respect to said barrel assembly, the second of said members being free to move axially with respect to said barrel assembly, a plurality of Belleville springs stacked about said second member and urging said second member into engagement with said first member, and means concentric with said members adjacent said clutch facings, said means having sufficient rigidity to maintain the axial alignment of said facings, at least one of said members being rotatable with respect to said means.

2. In a device of the character described, an internally threaded barrel having a portion of the periphery thereof formed with a contiguous series of teeth, an externally threaded inner barrel adapted to be received within and engage the threads of said outer barrel thereby forming a hollow barrel assembly the axial length of which may be varied by rotating one barrel with respect to the other, a dog releasably affixed to the surface of said inner barrel and having teeth adapted to engage the teeth on said outer barrel to thereby limit the rotation of one barrel with respect to the other, a driven member, a driving member in axial alignment with the driven member, said members being formed with annular cam-type clutch faces mating with each other, said clutch faces being of a harmonic curved configuration, said members passing axially through the ends of said barrels and being journaled therein with the clutch ends of said members within the barrel assembly, one of said members having a shoulder abutting the inner end of the adjacent barrel portion thereby limiting the outward movement of the member with respect to the barrel, the other of said members having a shoulder formed on the portion thereof within the barrel but being arranged for axial movement of the member in the journal, a plurality of Belleville springs stacked in series between said last mentioned shoulder and the inner end of the barrel thereby resisting axial movement of said last mentioned member with respect to the barrel, a ball-type thrust bearing between said springs and said barrel, and means concentric with said members adjacent said clutch facings, said means having sufficient rigidity to maintain the axial alignment of said facings, at least one of said members being rotatable with respect to said means.

3. In a device of the character described, a first barrel, a second barrel, said barrels being adapted to be threadably engaged one with the other thereby forming a hollow barrel assembly the axial length of which may be varied by rotating one barrel with respect to the other, a dog releasably affixed to the surface of said second barrel and adapted to engage said first barrel to thereby limit the rotation of one barrel with respect to the other, a driven member, a driving member in axial alignment with the driven member, said members being formed with annular cam-type clutch faces mating with each other, said members passing axially through the ends of said barrels and being journaled therein with the clutch ends of said members within the barrel assembly, one of said members having abutting means adapted to abut the inner end of the adjacent barrel portion thereby limiting the outward movement of the member with respect to the barrel, the other of said members having a shoulder formed on the portion thereof within the barrel but being arranged for axial movement of the member in the journal, resilient means positioned between said shoulder and the inner end of the barrel thereby resisting axial movement of said last-mentioned member with respect to the barrel, a thrust bearing between said resilient means and said barrel, and means concentric with and adjacent said clutch facings to maintain the axial alignment of said facings, at least one of said members being rotatable with respect to said means.

4. In a device of the character described, a first barrel, a second barrel, said barrels being adapted to be threadably engaged one with the other thereby forming a hollow barrel assembly the axial length of which may be varied by rotating one barrel with respect to the other, a dog releasably affixed to the surface of said second barrel and adapted to engage said first barrel to thereby limit the rotation of one barrel with respect to the other, a driven member, a driving member in axial alignment with the driven member, said members being formed with annular cam-type clutch faces mating with each other, said clutch faces being of such sine curve configuration that the slope of the curve at no point shall exceed the angle of repose of said members, said members passing axially through the ends of said barrels and being journaled therein with the clutch ends of said members within the barrel assembly, one of said members having abutting means adapted to abut the inner end of the adjacent barrel portion thereby limiting the outward movement of the member with respect to the barrel, the other of said members having a shoulder formed on the portion thereof within the barrel but being arranged for axial movement of the member in the journal, resilient means positioned between said shoulder and the inner end of the barrel thereby resisting axial movement of said last-mentioned member with respect to the barrel, a thrust bearing between said resilient means and said barrel, and means concentric with and adjacent said clutch facings to maintain the axial alignment of said facings, at least one of said members being rotatable with respect to said means.

5. In a device of the character described, a first barrel, a second barrel, said barrels being adapted to be threadably engaged one with the other thereby forming a hollow barrel assembly the axial length of which may be varied by rotating one barrel with respect to the other, a dog releasably affixed to the surface of said second barrel and adapted to engage said first barrel to thereby limit the rotation of one barrel with respect to the other, a driven member, a driving member in axial alignment with the driven member, said members being formed with annular cam-type clutch faces mating with each other, said members passing axially through the ends of said barrels and being journaled therein with the clutch ends of said members within the barrel assembly, one of said members having abutting means adapted to abut the inner end of the adjacent barrel portion thereby limiting the outward movement of the member with respect to the barrel, the other of said members having a shoulder formed on the portion thereof within the barrel but being arranged for axial movement of the member in the journal, resilient means positioned between said shoulder and the inner end of the barrel thereby resisting axial movement of said last-mentioned member with respect to the barrel, a thrust bearing between said resilient means and said barrel, and an annular collar telescoped over said clutch facings to maintain the axial alignment of said members, at least one of said members being rotatable with respect to said collar.

6. In a device of the character described, a first barrel, a second barrel, said barrels being adapted to be threadably engaged one with the other thereby forming a hollow barrel assembly the axial length of which may be varied by rotating one barrel with respect to the other, a dog releasably affixed to the surface of said second barrel and adapted to engage said first barrel to thereby limit the rotation of one barrel with respect to the other, a driven member, a driving member in axial alignment with the driven member, said members being formed with annular cam-type clutch faces mating with each other, said members passing axially through the ends of said barrels and being journaled therein with the clutch ends of said members within the barrel asembly, one of said members having abutting means adapted to abut the inner end of the adjacent barrel portion thereby limiting the outward movement of the member with respect to the barrel, the other of said members having a shoulder formed on the portion thereof within the barrel but being arranged for axial movement of the member in the journal, resilient means positioned between said shoulder and the inner end of the barrel thereby resisting axial movement of said last-mentioned member with respect to the barrel, a thrust bearing between said resilient means and said barrel, and a circular plug within said annular cam-type clutch faces to maintain the axial alignment of said facings.

7. In a device of the character described, a first barrel having a portion of its periphery formed with a contiguous series of teeth, a second barrel, said barrels being adapted to be threadably engaged one with the other thereby forming a hollow barrel assembly the axial length of which may be varied by rotating one barrel with respect to the other, a dog releasably affixed to the surface of said second barrel and having teeth adapted to engage the teeth on said first barrel to thereby limit the rotation of one barrel with respect to the other, a driven member, a driving member in axial alignment with the driven member, said members being formed with annular cam-type clutch faces mating with each other, said members passing axially through the ends of said barrels and being journaled therein with the clutch ends of said members within the barrel asembly, one of said members having abutting means adapted to abut the inner end of the adjacent barrel portion thereby limiting the outward movement of the member with respect to the barrel, the other of said members having a shoulder formed on the portion thereof within the barrel but being arranged for axial movement of the member in the journal, resilient means positioned between said shoulder and the inner end of the barrel thereby resisting axial movement of said last-mentioned member with respect to the barrel, a thrust bearing between said resilient means and said barrel, and means concentric with and adjacent said clutch facings to maintain the axial alignment of said facings, at least one of said members being rotatable with respect to said means.

8. In a device of the character described, a first barrel, a second barrel, said barrels being adapted to be threadably engaged one with the other thereby forming a hollow barrel assembly the axial length of which may be varied by rotating one barrel with respect to the other, a dog releasably affixed to the surface of said second barrel and adapted to engage said first barrel to thereby limit the rotation of one barrel with respect to the other, a driven member, a driving member in axial alignment with the driven member, said members being formed with annular cam-type clutch faces mating with each other, said members passing axially through the ends of said barrels and being journaled therein with the clutch ends of said members within the barrel assembly, one of said members having abutting means adapted to abut the inner end of the adjacent barrel portion thereby limiting the outward movement of the member with respect to the barrel, the other of said members having a shoulder formed on the portion thereof within the barrel but being arranged for axial movement of the member in the journal, resilient means positioned between said shoulder and the inner end of the barrel thereby resisting axial movement of said last-mentioned member with respect to the barrel, a thrust bearing between said resilient means and said barrel, means concentric with and adjacent said clutch facings to maintain the axial alignment of said facings, at least one of said members being rotatable with respect to said means, a circumferential indicating scale on said first barrel adjacent said dog, and an indexing mark on said dog cooperating with said scale, whereby the pressure between said clutch faces can be related to the relative position of said first and second barrels.

WILTON FOLSOM HOAG.
CLARENCE F. CARLSON.

REFERENCES CITED

The following references are of record in the file of this patent:

UNITED STATES PATENTS

| Number | Name | Date |
|---|---|---|
| 508,426 | Klipstein | Nov. 14, 1893 |
| 829,854 | Dexter | Aug. 20, 1906 |
| 857,632 | Kihlgren | June 25, 1907 |
| 1,237,932 | Marlin | Aug. 21, 1917 |
| 1,667,725 | Dykes | May 1, 1928 |
| 1,769,510 | Herman | July 1, 1930 |
| 2,275,004 | Behl | Mar. 3, 1942 |

FOREIGN PATENTS

| Number | Country | Date |
|---|---|---|
| 749,550 | France | 1933 |